United States Patent [19]
Smoot et al.

[11] 3,790,274
[45] Feb. 5, 1974

[54] CARRIAGE ADJUSTING MECHANISM FOR CAMERA

[75] Inventors: Charles W. Smoot, Skokie; Arvids Saldenais, Palatine, both of Ill.

[73] Assignee: Apeco Corporation, Evanston, Ill.

[22] Filed: Mar. 16, 1973

[21] Appl. No.: 341,995

[52] U.S. Cl. ................... 355/55, 355/18, 355/53
[51] Int. Cl. .......................................... G03b 27/52
[58] Field of Search ....... 355/55, 56, 58, 53, 18, 62, 355/61

[56] References Cited
UNITED STATES PATENTS
3,724,948  4/1973  Wally et al. ................. 355/56 X
2,506,347  5/1950  Davis ............................ 355/58

Primary Examiner—Richard L. Moses
Attorney, Agent, or Firm—C. Frederick Leydig et al.

[57] ABSTRACT

An adjusting mechanism for a camera used for exposing photographic plates and the like having a frame for the slidable mounting of a lens carriage and a copy board carriage. Power operated feed screws are captively journaled on the frame. The feed screws have respective traveling nuts permanently threaded thereon. Each nut has a keyed connection with the associated carriage. Each feed screw is calibrated in terms of carriage position. The yoke is swingable away from the carriage to break the keyed connection to permit rapid manual sliding of the carriage to a new position and swingable toward the carriage for subsequent engagement of the keyed connection for normal operation of the screw and with automatic reestablishing of the calibration. A clamp including a toggle is provided for clamping the yoke tightly to the carriage during normal operation of the feed screw. An interlock switch is provided to enable driving of the feed screw only when the yoke is firmly clamped in seated position.

8 Claims, 5 Drawing Figures

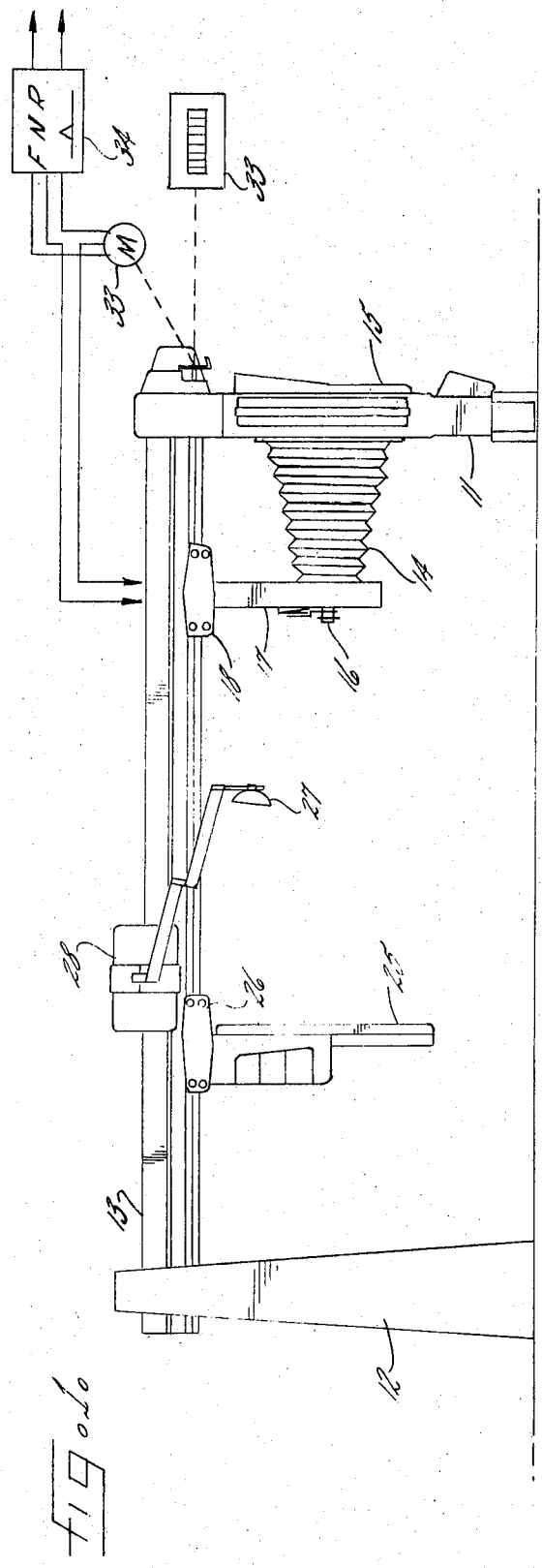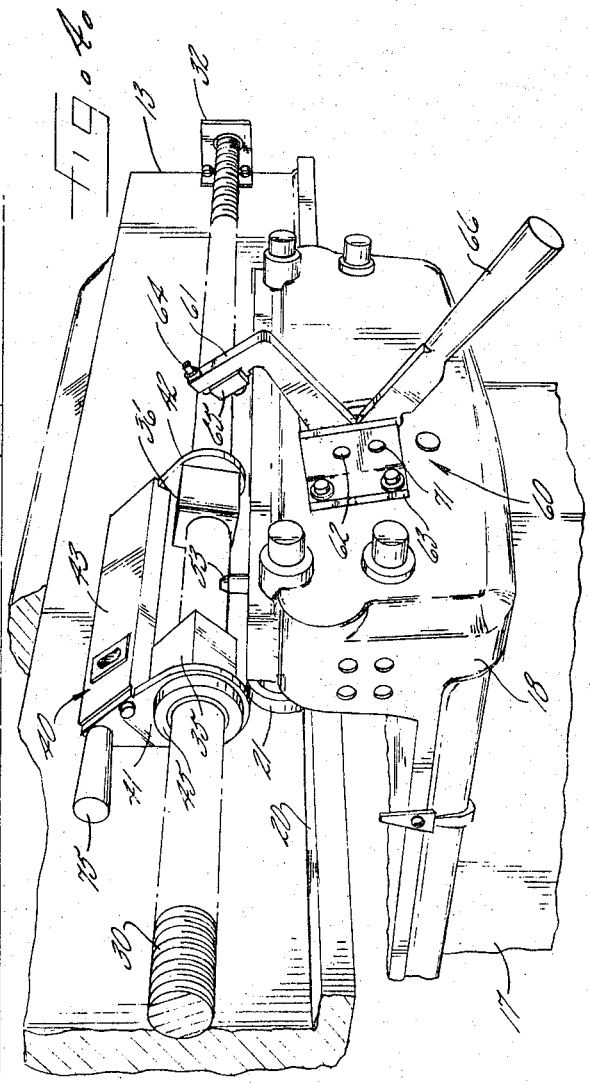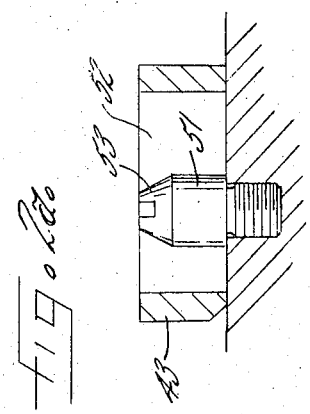

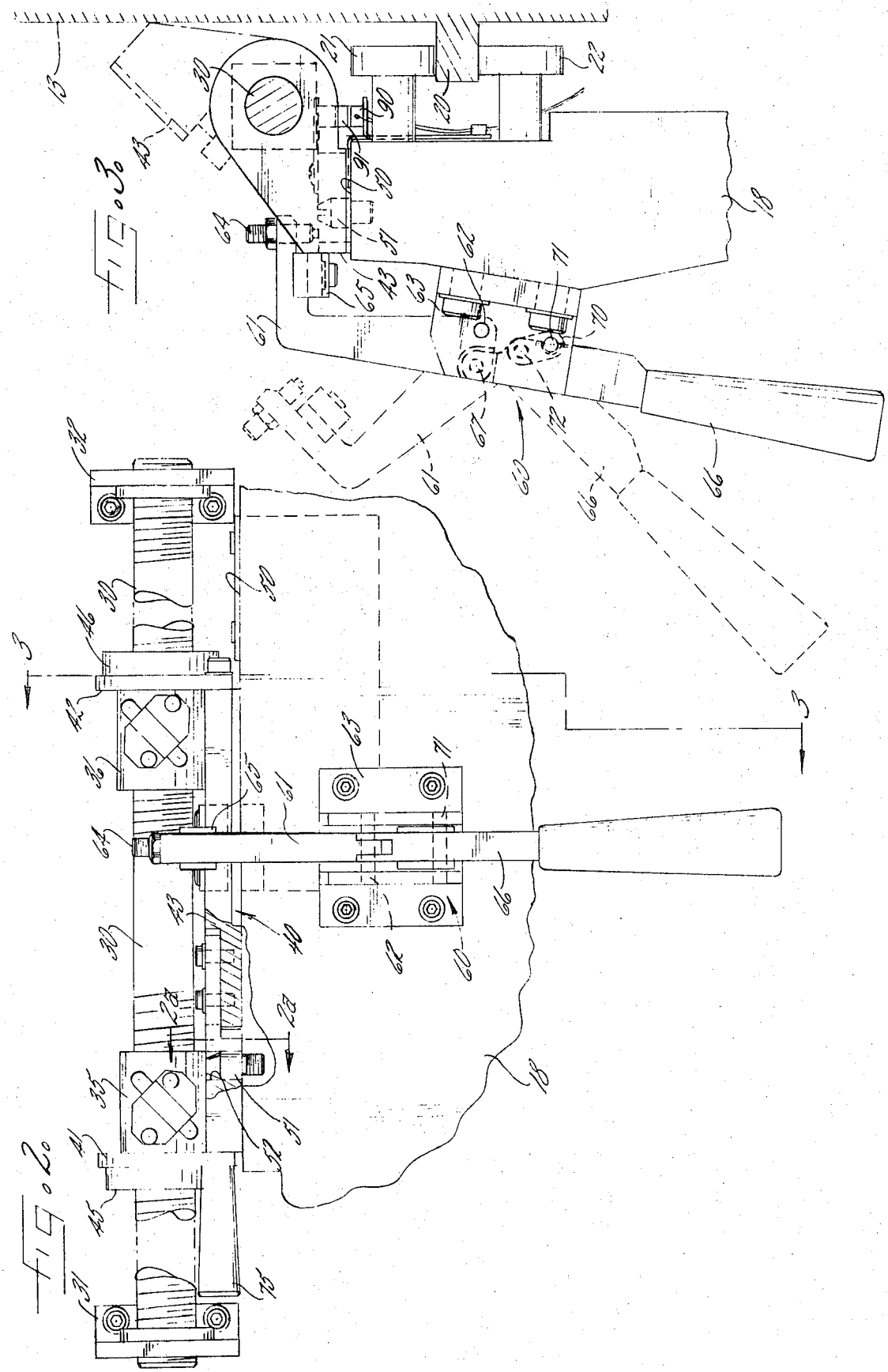

CARRIAGE ADJUSTING MECHANISM FOR CAMERA

In the large cameras employed for making lithographic plates and the like it is known to provide a feed screw on the frame for engaging a traveling nut on the lens carriage or copyboard carriage for propelling the same along a frame in one direction or the other. It is further known to calibrate the feed screw in terms of carriage position.

It is an object of the present invention to provide a drive for a carriage which includes a calibrated feed screw but which permits the feed screw to be uncoupled from the carriage for rapid manual sliding in one direction or the other while nevertheless permitting the carriage to be easily and quickly recoupled to the feed screw in a condition of precise register and with automatic reestablishment of calibration. Thus, it is the general object of the present invention to provide a carriage drive for a large camera which is highly flexible permitting either calibrated power driving of the carriage by a feed screw or rapid manual movement of the carriage as may be required without affecting the accuracy of positional calibration.

It is a more specific object of the present invention to provide a carriage adjusting arrangement which may be operated either in a calibrated power drive mode or a rapid manual mode and which has provision for easily and quickly switching back and forth between the two modes to achieve the advantages of each.

It is a still further object of the present invention to provide an adjusting mechanism for a large camera which provides a high degree of flexibility but which is nevertheless inherently inexpensive and easily installed on cameras of existing design, either during manufacture or subsequently as a modification in the field.

Other objects and advantages of the invention will become apparent upon reading the attached detailed description and upon reference to the drawings in which:

FIG. 1 is an elevational view, at greatly reduced scale, of a camera including the present invention;

FIG. 2 is a fragmentary view in elevation of the adjusting mechanism for the lens carriage;

FIG. 2a is a fragmentary section taken along the line 2a—2a in FIG. 2;

FIG. 3 is a sectional view of the adjusting mechanism taken along the line 3—3 in FIG. 2; and FIG. 4 is a perspective view showing the nut disengaged for manual sliding of the lens carriage.

While the invention has been described in connection with a preferred embodiment, it will be understood that we do not intend to be limited to the particular embodiment shown but intend, on the contrary, to cover the various alternative and equivalent forms of the invention as may be included within the spirit and scope of the appended claims.

Turning now to the drawings there is disclosed in FIG. 1 a typical floor-mounted camera capable of exposing photographic plates or the like having a main frame 11 and end frame 12 bridged by an overhead frame member 13. Supported on the main frame 11 are a bellows 14 and removable back plate 15. At the front end of the bellows is a lens 16 mounted upon a lens board 17 which is supported by a lens carriage 18.

Referring particularly to FIG. 3, the elevated frame member 13 includes longitudinal way surfaces, a portion of which are in the form of a rail 20 engaged by upper and lower rollers 21, 22 which are journaled upon, and act to support, the lens carriage. The rollers 21, 22 comprise a pair and it will be understood that for the sake of stability and linearity of movement a second pair of rollers horizontally spaced therefrom are provided but not illustrated in the drawings.

Mounted in axial alinement with the lens is a copyboard 25 which is supported upon a copyboard carriage 26 longitudinally movable upon way surfaces. The copyboard is illuminated by lamps 27 which are mounted upon arms secured to a lamp carriage 28. The lamp carriage does not, per se, form a part of the present invention. In the paragraphs to follow the means for adjusting the lens carriage 18 will be discussed in some detail. It will be understood that means similar in principle are provided for adjusting the copyboard carriage 26, but such adjusting means, being largely duplicative, will not be described.

In accordance with the present invention a feed screw captively journaled on the frame parallel to the way surface has a traveling nut permanently secured to it. A keyed connection is interposed between the nut and the carriage so that the carriage is propelled by the nut in a registered position and with a revolution counter being connected to the feed screw calibrated directly in terms of carriage position. Means are provided for breaking the keyed connection thereby to permit rapid manual sliding of the carriage to a new position free of the nut and for subsequently engaging the keyed connection with the carriage in register with the nut for automatic reestablishment of the calibration. Thus, turning to the drawings and particularly to FIGS. 2 and 3 there is shown a feed screw 30 captively journaled in bearings 31, 32 secured to the frame member 13. By the term "captively secured" is meant that the screw is free to rotate but blocked against endwise movement in either direction. The screw is rotated in opposite directions by a reversible motor 33 under the control of a controller or switch 34 having forward, neutral and reverse positions. Permanently threaded upon the feed screw 30 is a nut consisting of two spaced portions 35, 36. The nut is preferably of the type employing circulating balls. For the purpose of supporting the portions 35, 36 of the nut, a yoke 40 is provided having a pair of arms or brackets 41, 42 which are interconnected by a flat yoke plate 43. Clamping nuts of circular configuration and indicated at 45, 46 permit adjustment of the spacing of the portions 35, 36 to take up any endwise play.

For providing engagement between the yoke 40 and the carriage, the carriage has a flat seating surface 50 into which is screwed a locator pin 51 which fits into a receiving opening 52 which is in the form of a transversely extending slot cut into the yoke plate. The locator pin has a tapered or conical tip 53 (FIG. 2a) which acts as a pilot so that when the plate 43 is engaged with the pin the carriage is crowded endwise in one direction or the other until full fitted engagement, and hence accurate register in the axial direction, is achieved.

In accordance with one of the aspects of the invention, means are provided for clamping the yoke plate to maintain the keyed connection with the locator pin during the time that the feed screw 30 is being rotated. This is accomplished by a manually operated toggle mechanism illustrated in FIG. 3. The clamp indicated at 60, includes a clamping arm 61 of dog-leg shape which is mounted upon a pivot pin 62 secured in a bracket 63. The arm 61 has an adjustable clamping or set screw 64 at its outer end. In order to limit the amount of inward swing of the clamp arm 61 a blocking member 65 is secured to it positioned to engage the presented lateral edge of the yoke plate 43.

For rocking the arm 61, an operating lever 66 is provided which is pinned to the arm 61 by a pin 67. To secure toggle action the operating lever 66 is not directly pivoted to the bracket 63. Instead, a short toggle link 70 is interposed which is pivoted to the bracket by a pin 71 and to the lever by a pin 72. With the mechanism "clamped up" as shown in FIG. 3, the toggle pins 71, 72 are substantially alined with the pin 67 so that the arm 61 is firmly braced in position. To release the clamping force, the operating lever 66 is pulled outwardly into the dotted position which moves the toggle pin 72 to the left of the position shown causing the toggle link to rotate counterclockwise which acts to draw the pin 67 downwardly so that the clamping arm 61 rotates into the retracted position indicated by the dotted lines. The backward swinging of the clamping arm 61 frees the yoke plate so that the yoke may be swung, accompanied by rotation of the nut 35, 36 upwardly about the axis of the feed screw (see also FIG. 4), thus disengaging the locator pin 51. Upward swing of the yoke is facilitated by providing a handle 75. With the yoke 40, and hence the nut, disengaged from the carriage, the carriage is free to be pushed in one direction or the other along the longitudinal way surfaces. The carriage may be provided with a pointer which cooperates with a longitudinal scale so that the lens may be located at a particular spacing with respect to the camera back employed as a reference. The positions of the lens board and copy board are generally obtained from a table of settings depending upon the size of the original to be copied and the ratio of the enlargement, or reduction, which may be desired.

In accordance with one of the aspects of the present invention, the feed screw 30 is coupled to a revolution counter 80 which is calibrated directly in terms of carriage position and which preferably provides direct digital indication of the lens position as measured decimally in inches or centimeters, from the camera back plate or other suitable reference. Thus, when the yoke is disengaged from the carriage by clearing the locator pin 51, the reading of the revolution counter 80 is no longer indicative of the position of the carriage. However, in accordance with the invention, when the carriage is manually restored to a condition of near-register and the yoke 40 on the nut is swung downwardly by the handle 75, engagement of the opening 52 with the locator pin 51 crowds the carriage edgewise until the yoke plate is seated upon the surface 50 with the locator pin 51 fully engaged. Reestablishment of the keyed connection reestablishes the original calibration of the feed screw so that the revolution counter 80 again reads directly, and accurately, in terms of carriage, that is to say, lens, position.

The motor 33 may then be energized by the controller 34 to rotate the feed screw to change the setting of the lens by direct digital indication.

In carrying out the present invention means are provided for enabling rotation of the drive motor 33 only when the yoke is seated in its keyed position upon the carriage. This is accomplished by providing a proximity switch 90 (see FIG. 3) which is mounted upon the carriage and which has a proximity element 91 suitably mounted upon the yoke. Swinging the yoke downwardly brings the element 91 into close proximity with the switch 90 thereby closing the circuit so that current may be provided to the motor. Conversely, swinging the yoke upwardly opens the circuit and disables the motor.

As stated, the above discussion has, for simplicity, been limited to the means for adjusting the carriage 18 which positions the lens. It will be understood that a feed screw similar to the feed screw 30 is captively journaled on the opposite side of the horizontal frame member 13 for engaging a similar nut secured to a similar yoke and with a similar toggled clamping mechanism.

It will be understood that the term "yoke" as used herein is not limited to any particular shape or form and is intended to denote a bracket secured to the traveling nut and which serves to couple the nut to the carriage. It will also be apparent to one skilled in the art that while it is preferred to mount the locator pin on the carriage and to provide an opening therefor in other specific forms of keyed yoke, the positions of the pin and opening may, if desired, be interchanged and, indeed, other specific forms of keyed connection for establishing a condition of longitudinal register may be employed if desired without departing from the present invention. Finally, while it is desired to have the revolution counter 80 calibrated directly in terms of units of length, it will be understood that the invention is not limited thereto and the reading of the device 80 may be arbitrary but nonetheless precisely related to the phase position of the nut upon the feed screw and capable of conversion into units of distance by employing a suitable conversion table.

Finally, while a swingable yoke is preferred to secure engagement and disengagement of the keyed connection, such swinging movement is not essential and one of the engaging key members may, if desired, be mounted for translational disengagement, again without departing from the invention.

What is claimed is:

1. In a camera for exposing photographic plates and the like the combination comprising a frame having a longitudinal way surface, a carriage slidably mounted on the way surface, a feed screw captively journaled to the frame parallel to the way surface, means for rotating the feed screw, a traveling nut permanently threaded on the feed screw, the nut having a yoke rigidly secured thereto so that the yoke is swingable about the feed screw between a disengaged position in which the yoke is separated from the carriage and an engaged position in which the yoke is seated upon the carriage a keyed connection interposed between the yoke and the carriage and which is engageable as the yoke is brought into contact with the carriage to establish a condition of precise register between the nut and the carriage, a revolution counter connected to the feed screw and calibrated in terms of carriage position and a manually operated clamp for clamping the yoke to the carriage to maintain the keyed connection in engagement during operation of the screw.

2. The combination as claimed in claim 1 in which the clamp includes an overcenter toggle together with a handle for swinging the toggle to its overcenter condition for clamping of the yoke.

3. In a camera for exposing photographic plates and the like the combination comprising a frame having a longitudinal way surface, a carriage slidably mounted on the way surface, a feed screw captively journaled on the frame parallel to the way surface, means for rotating the feed scre, a traveling nut permanently threaded on the feed screw, the nut having a yoke rigidly secured thereto so that the yoke is swingable about the feed screw, a keyed connection interposed between the yoke and the carriage for registering the carriage with the nut and for movement of the carriage by the nut, a revolution counter connected to the feed screw and calibrated in terms of carriage position, the yoke being swingable away from the carriage to break the keyed connection thereby to permit rapid manual sliding of the carriage to a new position free of the nut, the yoke being swingable toward the carriage for subsequent engagement of the keyed connection so that the nut is coupled to the carriage with automatic reestablishment of calibration, and manually operated means for maintaining the keyed connection in engagement during operation of the screw.

4. In a camera for exposing photographic plates and the like the combination comprising a frame having a longitudinal way surface, a carriage slidably mounted on the way surface, a feed screw captively journaled on the frame parallel to the way surface, means for rotating the feed screw, a traveling nut permanently threaded on the feed screw, a keyed connection interposed between the nut and the carriage for registering the carriage with the nut and for movement of the carriage by the nut, a revolution counter connected to the feed screw and calibrated in terms of carriage position, manually operated means for breaking the keyed connection thereby to permit rapid manual sliding of the carriage to a new position free of the nut and for subsequently engaging the keyed connection with the carriage in register with the nut so that the nut is again coupled to the carriage with automatic reestablishment of calibration, and manually operated means for maintaining the keyed connection in engagement during operation of the screw.

5. In a camera for exposing photographic plates and the like, the combination comprising a frame having a longitudinal way surface, a carriage slidably mounted on the way surface, a feed screw captively journaled on the frame, means for rotating the feed screw, a traveling nut permanently threaded on the feed screw, the nut having two separated portions and having a yoke interconnecting the same for taking up play between the nut and the screw, the yoke having an arm and the carriage having a cooperating seating surface for the arm, a keyed connection interposed between the arm and the seating surface to provide accurate register between the nut and the carriage, means for manually disengaging the keyed connection thereby to permit rapid manual sliding of the carriage to a new position free of the nut and for subsequently engaging the keyed connection with the carriage in register with the nut so that the nut is coupled to the carriage with automatic reestablishment of calibration.

6. In a camera for exposing photographic plates and the like the combination comprising a frame having a longitudinal way surface, a carriage slidably mounted on the way surface, a feed screw captively journaled on the frame parallel to the way surface, means for rotating the feed screw, a traveling nut permanently threaded on the feed screw, the nut having a yoke engageable with the carriage, a keyed connection interposed between the yoke and the carriage, a keyed connection interposed between the yoke and the carriage for normal movement of the carriage by the nut, a revolution counter connected to the feed screw and calibrated in terms of carriage position, manually operated means for breaking the keyed connection thereby to permit rapid manual sliding of the carriage to a new position free of the nut and for subsequently engaging the keyed connection, the keyed connection including tapered surfaces so that when the carriage is manually moved into approximate register with the nut, closure of the keyed connection crowds the carriage along the way surface in one direction or the other into a condition of precise register of the carriage with respect to the nut for automatic reestablishment of the calibration.

7. In a camera for exposing photographic plates and the like the combination comprising a frame having a longitudinal way surface, a carriage slidably mounted on the way surface, a feed screw captively journaled on the frame parallel to the way surface, means for rotating the feed screw, a traveling nut permanently threaded on the feed screw, the nut having two separated portions and having a yoke with a flat yoke plate interconnected between them for the purpose of removing endwise play, a seating surface on the carriage for seating the yoke plate, a locator pin projecting upwardly with respect to the seating surface, the yoke plate having an opening in the form of a fitted transversely extending slot for registering with the locator pin, a revolution counter connected to the feed screw and calibrated in terms of carriage position, the yoke plate being swingable on the nut away from the seating surface to disengage the locator thereby to permit rapid manual sliding of the carriage to a new position free of the nut, the yoke plate being swingable into engagement with the seating surface for subsequent engagement of the locator pin so that the nut is coupled to the carriage with automatic reestablishment of calibration, a clamping arm on the carriage swingable between a position clear of the yoke plate and a clamping position in which the yoke plate is engaged and clamped upon the seating surface, and manual means for moving the clamping arm between its two positions.

8. In a camera for exposing photographic plates and the like the combination comprising a frame having a longitudinal way surface, a carriage slidably mounted on the way surface, a feed screw captively journaled on the frame parallel to the way surface, power driven means including a reversible motor for rotating the feed screw, a traveling nut permanently threaded on the feed screw, a registering keyed connection interposed between the nut and the carriage for movement of the carriage by the nut, a revolution counter connected to the feed screw and calibrated in terms of carriage position, manually operated means for breaking the keyed connection thereby to permit rapid manual sliding of the carriage to a new position free of the nut and for subsequently engaging the keyed connection with the carriage in register with the nut so that the nut is again coupled to the carriage with automatic reestablishment of calibration, and an interlock switch responsive to engagement of the keyed connection for completing a ircuit to the motor.

* * * * *